United States Patent [19]

Laibson et al.

[11] 3,902,583

[45] Sept. 2, 1975

[54] LOAD BEARING TRAY

[75] Inventors: Jerry Laibson, San Diego; Jim C. Keogh, Jr., Cardiff by the Sea, both of Calif.

[73] Assignee: Whittaker Corporation, Los Angeles, Calif.

[22] Filed: Sept. 21, 1970

[21] Appl. No.: 73,982

[52] U.S. Cl. ............ 193/35 MD; 244/118; 244/133
[51] Int. Cl. ................................................ B64c 1/20
[58] Field of Search ......... 193/35 MD; 161/68, 116, 161/117, 149, 161; 244/118, 133

[56] References Cited
UNITED STATES PATENTS

| | | | |
|---|---|---|---|
| 1,568,362 | 1/1926 | Brown | 193/35 MD |
| 2,112,336 | 3/1938 | Duvall | 193/35 MD X |
| 2,728,702 | 12/1955 | Simon et al. | 244/133 X |
| 2,949,992 | 8/1960 | Weinberg | 193/35 MD |
| 3,235,040 | 2/1966 | Ellis | 161/149 X |
| 3,283,052 | 11/1966 | Munk | 161/149 X |
| 3,421,678 | 1/1969 | Thompson et al. | 161/68 X |

FOREIGN PATENTS OR APPLICATIONS

| | | | |
|---|---|---|---|
| 543,524 | 3/1942 | United Kingdom | 193/35 MD |
| 22,316 | 11/1896 | United Kingdom | 193/35 MD |

*Primary Examiner*—Evon C. Blunk
*Assistant Examiner*—W. Scott Carson
*Attorney, Agent, or Firm*—Donald E. Nist; Jay H. Quartz

[57] ABSTRACT

The load bearing tray broadly comprises a pair of panels with a core material sandwiched therebetween and bonded to both panels. At least one of these panels has formed therein a plurality of indentations which project into the core material. A fluid-impermeable edge member sealingly engages both of the panels to provide a fluid barrier around the periphery of the tray.

In a specific embodiment, a cargo transfer ball tray is provided in which each of the indentations supports a ball bearing which is positioned within a cavity opening through the non-indented skin and which projects through the non-indented skin. Retaining rings are attached to the non-indented skin to retain the ball bearings in their cavities while permitting free rotation of the ball bearings as cargo is moved across the tray.

2 Claims, 5 Drawing Figures

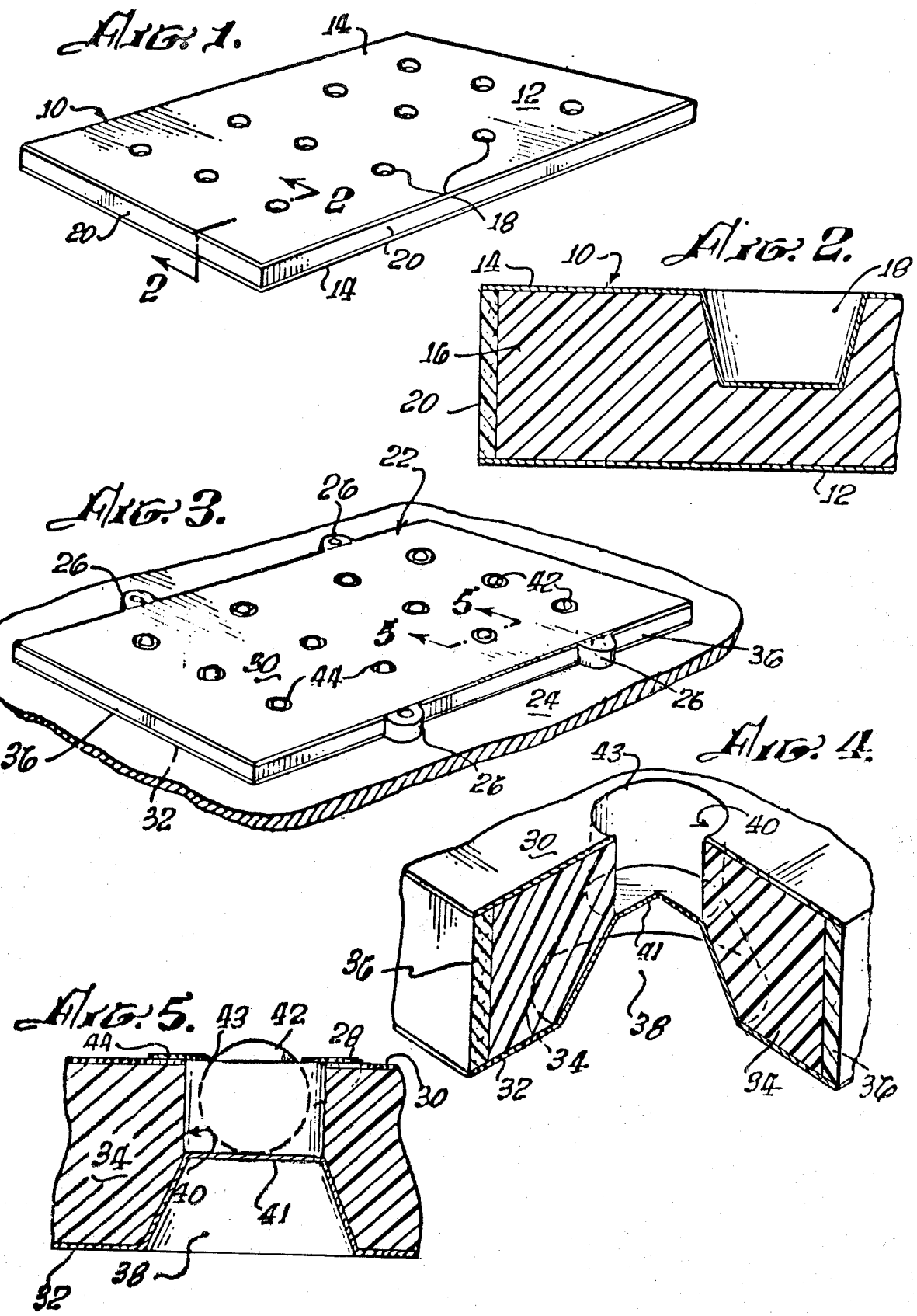

LOAD BEARING TRAY

BACKGROUND OF THE INVENTION

This invention relates to trays of sandwich construction and, more specifically, to such trays which have load bearing capability.

Certain large cargo-carrying transports, such as aircraft, cannot be loaded by hand cart or powered vehicles either because the cargo is too large or heavy to be moved by workers or the cargo carrier does not lend itself to loading by powered vehicles. One solution is to use a multiplicity of cylindrical rollers which are pivoted at their ends and rotatable about their longitudinal axis. However, the problem with using such rollers is that the cargo can be moved easily only in one direction, that is, in the direction perpendicular to the longitudinal axis of the rollers.

A presently-employed solution to this problem includes the use of cargo transfer trays which can be anchored to a cargo deck and which comprise a pair of metallic sheets spaced from each other and strengthened therebetween by various combinations of angles and channels. Cavities with openings through the top sheet are provided to house ball bearings which partially project above the top sheet to facilitate movement of cargo containers over the top surface. Such structures provide for movement of cargo in any desired direction. However, the manufacturing cost is relatively high because of the riveting required to attach the various reinforcing angles and channels to the sheet members. Additionally, the heavy weight of these transfer trays constitutes a disadvantage in applications where weight is at a premium such as in aircraft.

In some applications, the cargo transfer ball trays are not continuously supported. That is, the supporting deck may provide discontinuous support, for example, where it is formed with a series of spaced, protruding ribs or where it comprises a series of spaced beams. In such applications, the solution has heretofore been to rely upon relatively heavy, thick metal sheets and reinforcing members to resist load deflections and internal sheer forces.

SUMMARY OF THE INVENTION

The load bearing trays of this invention broadly comprise a pair of facings with a core material sandwiched between and bonded to each of the facings. At least one of the panels has a plurality of indentations formed therein which extend into the core material. A fluid-impermeable edge material is employed as a peripheral wall sealingly engaging the two skins to prevent fluid from entering the core material.

In a specific embodiment, which is a cargo transfer ball tray, there is provided a plurality of cavities opening through a non-indented panel opposite each of the indentations formed in the other panel. Ball bearings are carried in each of the cavities, with the ball partially projecting above the surface of the non-indented panel. The ball bearings are retained within their respective cavities by retainer rings circumventing each bearing assembly and attached to the non-indented panel.

The trays of this invention are characterized by high load-bearing capability and relatively light weight. For example, the cargo transfer ball trays described herein can bear substantially the same loads, including deflection loads, as prior art ball trays even though they weigh only about one-third the weight of the prior art trays. This weight-saving feature is particularly important in aircraft where weight is at a premium. Furthermore, construction of the trays of this invention is relatively simple and, therefore, relatively inexpensive. The afore-mentioned advantages of the herein-described trays are obtained, even though the tray weight is reduced, by making up for the strength lost through weight loss through the use of dimpling and bonding of the core materials to the rigid panels so that the whole acts as a unitary structure.

DESCRIPTION OF THE DRAWINGS

FIG. 1 is a perspective view of an embodiment of this invention which does not include any bearing assemblies.

FIG. 2 is an elevational, cross-sectional view taken along the line 2—2 of FIG. 1.

FIG. 3 is a perspective view of a cargo transfer ball tray of this invention.

FIG. 4 is a corner sectional view shown in perspective (without bearing assembly) and taken along the line 4—4 of FIG 3.

FIG. 5 is an elevational cross-sectional view of a single bearing unit taken along the line 5—5 of FIG. 3.

DESCRIPTION OF THE PREFERRED EMBODIMENT

A load-bearing tray, which may be used, for example, in floors, will first be described. Referring now to FIGS. 1 and 2, the numeral 10 designates a tray which is shown, in FIG. 1, in its normally upside-down position. The tray 10 comprises a pair of facings 12,14 with a low density core 16 sandwiched therebetween and bonded to each facing 12,14 so that the tray 10 performs substantially as a unitary structure.

One of the facings 12, which is normally a bottom panel, has formed therein a plurality of indentations or dimples 18 which are spaced from each other in a pattern determined by the specific application in which the tray is employed. The shape of the indentations 18 is shown as frusto-conical but could be other than that, e.g., hemispherical. The height of the indentations 18 is dependent upon a number of factors such as the number of indentations in a unit area of a tray, the load required to be carried by a tray, and the height to diameter ratio of the indentations.

The facings 12,14 may be formed from any structurally rigid material such as a metal or hard plastic. Preferably, where weight is an important consideration, the facings 12,14 are made from aluminum. The thickness of the facings 12,14 will vary depending upon the material forming them, but satisfactory results have been obtained using 0.020 in. - 0.025 in. aluminum facings.

The low-density material forming the core 16 may be in the form of a honeycomb or of a foam. Useful honeycomb structures include paper and metal honeycomb. The foam may include any known low-density foam such as polyurethane and other resinous foams. The term "low-density" is used to designate core materials of about 2 lb/cu. ft. to about 11 lb/cu. ft. If the core 16 is a honeycomb, an adhesive, e.g., an epoxy adhesive, is employed to bond the honeycomb to the facings 12, 14. No adhesive is needed when the core is a foam since the latter bonds to the facings itself.

The thickness of the core 16 depends upon such factors as the type of material forming the core, the material forming the facings 12,14, the loads to be carried by the tray 10 and the deflection or bending forces to which the tray is subjected. In general, the core 16 is relatively thicker than the facings 12,14. For example, a polyurethane foam core thickness of about 2 in. may be used in combination with aluminum facings less than 0.1 in. thick.

The overall thickness of the tray 10 will vary depending upon the load and deflection requirements.

To preserve and to protect the low-density core material, it is preferable to provide the tray 10 with an edge wall or panel 20 formed from a fluid-impermeable, cut-resistant material. The use of such an edge wall material permits liquid cleaning of the tray 10 while preventing the liquid from penetrating into the core material. The edge wall 20 is bonded to both panels 12,14 to provide a seal against fluids. The edge wall 20 may be made from various materials including high density foam, e.g., 20 lb/cu. ft. polyurethane foam. The tray 10 may be assembled with only the bottom facing 12 dimpled, as has been described. Additionally, however, it may be assembled with both facings 12,14 dimpled and with the dimples extending into the core material from each facing.

Thus far, there has been described a lightweight tray for general load-bearing use. There will now be described a modification of this tray which permits heavy loads to be easily moved across it.

Referring now to FIGS. 3–5, the numeral 22 designates a cargo transfer ball tray of this invention. As shown in FIG. 3, the tray 22 may be anchored to a cargo deck 24 by clamp bolts (not shown) passing through fixtures 26 affixed to the tray 22. A plurality of ball trays 22 are usually placed adjacent to each other to substantially cover the cargo deck area.

Each ball tray 22 carries within it a plurality of bearing units 28 which are spaced from each other in a pattern which facilitates easy movement of cargo across the ball tray 22. As shown in greater detail in FIGS. 4 and 5, each tray 22 comprises an upper and a lower facing or sheet 30,32, respectively, with a core material 34 sandwiched therebetween and bonded to each of the facings 30,32. Fluid-impermeable edge walls 36 sealingly engage the panels 30,32 to completely enclose the core material 34. A plurality of indentations or dimples 38 are provided in the lower or bottom facing 32. To this point, the ball tray 22 is identical to the previously-described tray 10 including materials and dimensions.

The indentations 38 extend into the core material 34 and form the lower, supporting portion of each bearing unit 28. The upper portion of each bearing unit 28 comprises a bearing cavity 40 with its sides defined by the core material 34 and with its bottom defined by the uppermost sections 41 of the indentations 38 in the base facing 32. Each cavity 40 opens through holes 43 in the top facing 30. Bearing assemblies 42 are carried in each cavity 40 but partially project above the top panel 30 as shown in FIG. 5. Each bearing assembly 42 is retained in its respective cavity 40 by a retainer ring 44 (shown in FIGS. 3 and 5) which is connected to the top facing 30 by any appropriate means such as screws (not shown). Each bearing assembly 42 may include only a bearing or it may include a combination of springs and bearings.

To prevent, e.g., cleaning fluids, from entering the core material through the bearing cavities 40, a fluid-impermeable sleeve is preferably used as a liner around the walls of each cavity. The sleeves may be metallic, e.g., aluminum, and they are sealingly bonded to the upper and lower facings 30,32.

The herein-described trays 10,22 may be constructed in various ways. For example, indentations may be formed in a predetermined pattern in a facing which is to form the bottom face. If the core material is a honeycomb, the latter is placed between a flat top facing and the bottom facing and bonded thereto. The resulting sandwich structure is compressed to obtain a good bond. If the core material is a foam, the facings are held a predetermined distance apart, e.g., in a jig, and the core material is foamed in place. Excess foam is simply cut off the facing edges. In both cases, the edge walls can thereafter be bonded to the top and bottom facings along their periphery.

The ball tray 22 is formed in the same way except that holes are cut into the top facing in a pattern such that each hole is aligned with an indentation when the top and bottom facings are placed against one another. After the sandwich panel has been formed the bearing means are set in cavities formed or cut in the core material and aligned with the bottom facing indentations and the top facing holes. The retainer rings are then mounted to the top panel to retain the bearing means in their respective cavities.

The physical tie between the bearings 42 and the lower formed facing 32 results in a direct load transfer to the bottom facing 32 and, thereafter, to the supporting deck 24. The bottom facing 32 is capable of transforming the ball loads directly to a back up support or deck should such a support be in contact with the stiffened skin. However, since the ball tray 22 may not rest on a complete or continuous deck, thereby demanding a load transfer via bending across the discontinuities in the deck, the tray 22 with its very high inertia will resist any abnormal or yielding deflections. That is, the core 34 and upper facing 30 act in combination with the bottom, dimpled facing 32 to resist deflection of the latter and to resist shear forces in the tray 22.

We claim:

1. A cargo transfer ball tray comprising:
   a first facing forming a top member and having a plurality of holes formed therein;
   a second facing forming a bottom member and having a plurality of indentations formed therein, said indentations being in alignment with said holes in said top member and projecting, when said tray is assembled, into
   a low-density core material sandwiched between and bonded to said top and bottom members;
   a plurality of cavities formed in said core material intermediate each aligned pair of said aligned indentations and holes with the bottom of each said cavity defined by the uppermost section of one of said indentations, each said cavity opening through one of said holes in said top member;
   bearing means rotatably carried in each said cavity and projecting above said top member; and
   a liquid impermeable sleeve forming a liner for each said cavity and sealingly bonded to said top and said bottom members to prevent liquid from entering said core material from said cavities.

2. A cargo transfer ball tray comprising:

a first facing having a plurality of spaced holes formed therein in a predetermined pattern;

a second facing having a plurality of spaced indentations formed therein, said indentations being in alignment with said holes in said first facing and projecting into a low-density core material sandwiched between and bonded to said first and said second facing, said core material having a density between about 2 lb/cu.ft. and about 11 lb/cu.ft. and having a plurality of spaced cavities formed therein, each said cavity positioned intermediate an aligned pair of said indentations and said holes so that said indentations define the bottom of said cavity and so that said cavity opens through said aligned hole in said first facing;

a liquid impermeable edge member extending around the sides of said tray and sealingly engaging said first and said second facings;

bearing means rotatably carried within each said cavity and projecting through said holes in said first facing;

retainer means removeably attached to said first facing for retaining said bearing means in their respective cavities, said bearing means being free to rotate multi-directionally when cargo is moved along said cargo transfer ball tray; and a plurality of liquid impermeable sleeves, each said sleeve forming a lining for one said cavities and being bonded to said first and said second facings to prevent liquid from contacting said core material through said cavities.

* * * * *